United States Patent
Terme et al.

(10) Patent No.: US 10,161,800 B2
(45) Date of Patent: Dec. 25, 2018

(54) COOLED DETECTING DEVICE

(71) Applicant: SOCIÉTÉ FRANCAISE DE DÉTECTEURS INFRAROUGES—SOFRADIR, Palaiseau (FR)

(72) Inventors: Jean-Christophe Terme, Lans en Vercors (FR); Antoine Kessler, Voiron (FR)

(73) Assignee: SOCIETE FRANCAISE DE DETECTEURS INFRAROUGES—SOFRADIR, Palaiseau (FR)

( * ) Notice: Subject to any disclaimer, the term of this patent is extended or adjusted under 35 U.S.C. 154(b) by 0 days.

(21) Appl. No.: 15/123,912

(22) PCT Filed: Mar. 6, 2015

(86) PCT No.: PCT/FR2015/050552
§ 371 (c)(1),
(2) Date: Sep. 6, 2016

(87) PCT Pub. No.: WO2015/132538
PCT Pub. Date: Sep. 11, 2015

(65) Prior Publication Data
US 2017/0016772 A1  Jan. 19, 2017

(30) Foreign Application Priority Data

Mar. 6, 2014 (FR) ...................................... 14 00552

(51) Int. Cl.
*G01J 5/06* (2006.01)
*F25B 9/02* (2006.01)
*F25D 19/00* (2006.01)

(52) U.S. Cl.
CPC ................ *G01J 5/061* (2013.01); *F25B 9/02* (2013.01); *F25D 19/006* (2013.01)

(58) Field of Classification Search
CPC ..... F25B 9/02; G01J 5/061; G01J 5/06; F25D 19/006
See application file for complete search history.

(56) References Cited

U.S. PATENT DOCUMENTS

| | | |
|---|---|---|
| 4,488,414 A | 12/1984 | Jungkman et al. |
| 4,682,032 A | 7/1987 | Barrett |

(Continued)

FOREIGN PATENT DOCUMENTS

| | | |
|---|---|---|
| EP | 0 945 690 A2 | 9/1999 |
| GB | 1 238 470 A | 7/1971 |
| WO | 96/40834 A1 | 12/1996 |

*Primary Examiner* — Marcus Taningco
(74) *Attorney, Agent, or Firm* — Oliff PLC

(57) ABSTRACT

A detection device for infrared radiation has a detection circuit of infrared radiation equipped with at least one photodetector. A readout circuit is electrically connected to the detection circuit, and is configured to process the signal emitted by the detection circuit. A Joule-Thomson cooler cools a cold table thermally and mechanically connected to the detection circuit and the readout circuit. The cold table including an internal cavity supplied with gaseous mixture. A relief port of the gas mixture is arranged at an input in the internal cavity. An output of the compressor feeds the relief port in a gaseous mixture. The input of the compressor receives the relaxed gaseous mixture from an output of the internal cavity.

10 Claims, 1 Drawing Sheet

(56) References Cited

U.S. PATENT DOCUMENTS

| | | | | |
|---|---|---|---|---|
| 5,006,505 A * | 4/1991 | Skertic | ............ | H01L 35/18 |
| | | | | 136/203 |
| 5,119,637 A * | 6/1992 | Bard | ............ | F25B 9/02 |
| | | | | 62/224 |
| 5,590,538 A * | 1/1997 | Hsu | ............ | F25B 9/02 |
| | | | | 62/51.1 |
| 2006/0180752 A1 * | 8/2006 | Sobel | ............ | F17C 13/006 |
| | | | | 250/238 |
| 2008/0184711 A1 * | 8/2008 | Hingst | ............ | C09K 5/04 |
| | | | | 62/51.2 |

* cited by examiner

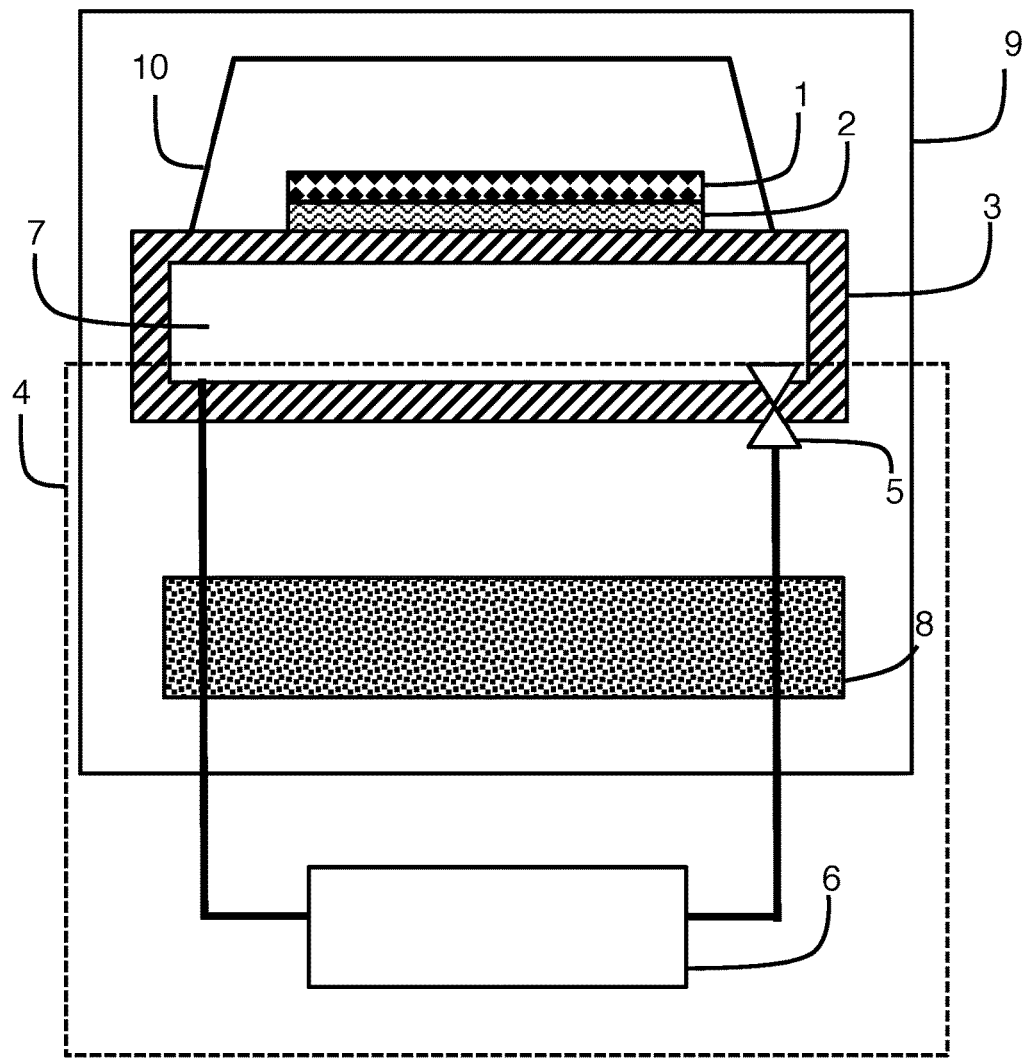

COOLED DETECTING DEVICE

TECHNICAL FIELD OF THE INVENTION

The invention relates to a cooled detection device.

STATE OF THE ART

In the field of detection devices, there is commonly a photodetector associated with a readout circuit. The photodetector provides a signal representative of the observed scene and this signal is processed by the readout circuit.

Biasing of the photodetector is obtained by means of a substrate potential provided on a first terminal of the photodetector and by means of a reference potential provided on the second terminal of the photodetector. The reference potential is provided, for example, by a readout device of capacitive transimpedance amplifier type.

In order to obtain significant detection performance, it is desirable to use specific substrates, for example based on Mercury, Cadnium, Tellurium and operate these at a low temperature. The use of a low temperature allows to limit stray electrical interference during the transformation of the optical signal into an electrical signal.

Conventionally, the detection circuit is thermally coupled to a cooling device that performs the evacuation of the heat. However this design is difficult to implement and the final performance of the device are less than what is expected from the theoretical point of view. The measured efficiency of coolers currently used is of the order of 8 to 10%, which makes it necessary to use significant quantities of energy to suitably cool the detection device.

OBJECT OF THE INVENTION

There is a need to provide a cooled detection device consuming less energy.

This requirement tends to be met by means of a device which comprises:
- a detection circuit for infrared radiation provided with at least one photodetector,
- a readout circuit electrically connected to detection circuit and configured to process the electrical signal emitted from the detection circuit,
- a Joule-Thomson cooler fitted with
  - a cold table thermally and mechanically connected to the detection circuit and the readout circuit, the cold table containing an internal cavity,
  - a relief port arranged at an input of the internal cavity,
  - a compressor having an output supplying the relief port with gas and an input receiving said relaxed gas from an output of the internal cavity.

SUMMARY DESCRIPTION OF THE DRAWINGS

Other advantages and features will become more apparent in the following description of specific embodiments of the invention given as non-limiting examples and represented in the appended drawings, wherein FIG. 1 illustrates in cross section, schematically, an electromagnetic radiation detection device.

DESCRIPTION OF PREFERRED EMBODIMENTS OF THE INVENTION

The detection device comprises a detection circuit 1 and a readout circuit 2. The readout circuit 2 and detection 1 are electrically connected in such a way that the readout circuit 2 processes the information outputted by detection circuit 1.

In a specific embodiment which can be combined with the latter, the detection circuit 1 is formed on a first semiconductor substrate and the readout circuit 2 is formed on a second semiconductor substrate to obtain improved detection characteristics and improved performance of the readout circuit 2. The two substrates are formed in different materials and are preferably hybridized to form a hybrid component. This particular configuration allows a compact system to be obtained. The hybridization of the two substrates is preferentially carried out by one or more beads of electrically conductive material which are arranged between the two substrates. The two substrates are mechanically attached to one another by molten beads.

The detection circuit 1 contains at least one photodetector transforming an optical signal into an electrical signal. The detection circuit is configured to be sensitive to electromagnetic radiation in a predetermined wavelength range by means of at least one photodetector. Preferably, the detection circuit contains a plurality of photodetectors.

For example, the photodetector is a photodiode, a quantum well or multiple quantum device. In a preferred embodiment, the photodetector performs the detection in the infrared field. For example, the detection circuit substrate is said substrate II-VI, for example on the basis of HgCdTe and substrate of the readout circuit is a silicon based substrate. Advantageously, the photodetector is configured to detect radiation within the range 1 µm-5 µm.

The detection device is a "cooled" device that is to say that it is intended to operate at a lower temperature to the ambient temperature in order to deliver improved technical characteristics in comparison to a device operating at the ambient temperature. Advantageously, the detection device is intended to work within the range 77 k-200 K, even more advantageous between 120 k and 200 K. For example, a P-type photodiode in a N substrate based on HgCdTe material can work to approximately 120 K. it is also possible to use a "XBn" type photodetector realised with alloys of GaSb/AlSbAs/InAsSb.

To obtain a cooled device, the detection circuit 1 is connected thermally to a cold source 4 that will capture the calories emitted and cool the detection circuit 1.

In a preferred embodiment, the cold source 4 is connected to the detection circuit 1 and preferably, to the readout circuit 2 in order to force operation of the assembly to a low temperature. A particular embodiment which can be combined with the previous embodiments, the cold source 4 is connected to the detection circuit 1 through the cold table 3. The detection circuit 1 and the readout circuit 2 are mechanically connected to the cold table 3. The detection circuit 1 is fixed to the cold table 3 through the readout circuit 2.

In the particular embodiment shown in FIG. 1, the cold source 4 is connected thermally to detection circuit 1 through the readout circuit 2 and through the cold table 3.

The cold source 4 is a Joule-Thomson cooler and more particularly a Joule-Thomson cooler in closed loop.

The Joule-Thomson cooler uses the Joule-Thomson relaxation and performs laminar and stationary relaxation of a pure gas or a gaseous mixture present in the cooler. This relaxation is achieved by passing the gas flow through a relief port 5. Relaxation is achieved in an insulated environment so as to obtain an isenthalpic relaxation. When passing through relief port 5 also called nozzle, there has been a change of pressure.

During the Joule-Thomson relaxation, the expansion of the gas is accompanied by a variation in temperature of the gas and particularly of a decrease in the temperature of the latter up to its liquefaction.

In comparison to a device according to the prior art which uses a Stirling type machine to achieve the cooling of the detection device, the use of a Joule-Thomson cooler in closed loop allows to reduce the energy consumption of the cooling module.

As an example, a Joule-Thomson cooler using pure nitrogen is able to work at the liquefaction temperature of nitrogen, i.e. 77 K. If the gas used is argon, the working temperature of cooler is equal to 82 K. The working temperature corresponds to the minimum equilibrium temperature between the solid and liquid phases.

By replacing a pure gas by a mixture of gases, it is possible to reduce the pressure gradient generated by the compressor between the low pressure circuit and the high pressure circuit. Advantageously, the mixture is also selected to operate the Joule-Thomson cooler to a working temperature which is suitable with the needs of the detection system.

Particularly advantageous, the gas mixture used allows the cooler to work with a low pressure gradient, typically with a pressure gradient between the upstream parts and downstream parts of a compressor less than or equal to either 15 bar or $15 \cdot 10^5$ Pa.

For example, to develop the working temperature of the cooler in the range of 120-200 K, the gas mixture contains at least one gas selected among ethane, isobutane, methane, krypton, propane, pentane, ethylene, and butane.

It is also advantageous to add an additive of HFE type (hydrofluoroether) in the mixture of gases in order to increase the operating range of the cooler. It is then possible to operate the cooler in the range −40° C.+71° C. For example, it is possible to use the HFE-7100 which contains 40% of 1-methoxy-1,1,2,2,3,3,4,4-nonafluorobutane and 60% of 1-methoxy-2-trifluoromethyl-1,1,2,3,3,3-hexafluoropropane. The use of such an additive allows to operate the cooler from ambient temperature. The additive allows starting the Joule-Thomson effect to the ambient temperature which cools the gas mixture which then takes place in the cooling at lower temperatures. In this configuration, it is not necessary to use a pre-cooling module.

If mixed gases are used, it is advantageous to add a non-liquefiable gas at operating temperature of the cooler in order to have a gas phase upstream and downstream of the compressor 6 which allows to improve propulsion of liquefied compounds of the mixture. For example, if the cooler has a working temperature between 120 and 200 K, it is advantageous to add nitrogen and/or argon.

The cooling system includes a low pressure part and a high pressure part.

The relaxed mixture is compressed by means of at least one compressor 6 that achieves the separation between low pressure part and high-pressure part. At the compressor 6, the mixture is introduced from the low pressure part to be injected in the high-pressure part.

Advantageously, the compressor 6 is configured to ensure a pressure gradient between 2 and 15 bar. The pressure gradient corresponds to the pressure difference that exists between the high-pressure part and the low pressure part.

Different technologies can be used to form the compressor 6. For example, the compressor 6 is a compressor with a membrane which uses the deformation of a membrane. It is also possible to use a compressor fitted with one simple piston or two pistons working in opposition phase. It is further possible to use a spiral compressor also called scroll compressor. It is also possible to use a vane compressor.

After its output of compressor 6, the gas is sent to relief port 5. The relief port 5 sends the other separation between the high-pressure part and the low pressure part. The Joule-Thomson relaxation takes place at the relief port 5. Advantageously, the relief port has a fixed section, but a variable port section is also possible.

The relaxation of the gas is done inside a cavity in the interior of cold table 3. In this way, the expansion of the gas in the internal cavity 7 leads to a decrease in temperature of the gas and in the temperature of cold table 3 preferably until the liquefaction temperature of the gas or gases. As detection circuit 1 is connected thermally on cold table 3, the expansion of gas in the internal cavity 7 leads to a cooling of detection circuit 1.

The cold table can be a monolithic element. However, to promote its design, it is advantageous to form a support and add a cover that will define at least partially the internal cavity. The bracket separates the detection circuit and the cover.

During relaxation, it is possible that at least a portion of the mixture passes from the gaseous phase to the liquid phase because of lowering the temperature. Internal cavity 7 advantageously includes an evaporator which is in thermal contact with the detection circuit to ensure better cooling. The evaporator allows to achieve a phase change from the liquid phase to the gaseous phase. To enhance evaporation, it is advantageous to texture the internal surface of the cavity and preferentially the cavity part that is nearest the detection circuit, to have the maximum thermal exchange in the vicinity of the detection circuit and therefore the maximum cooling.

The relaxed mixture passes through the evaporator and it is then sent to the input of the compressor 6 to be reinjected into the high-pressure part. The cooler gas circulates to the inside of a closed circuit which allows operation over long periods of time while occupying a smaller volume.

This configuration is particularly advantageous because it allows to mechanically decouple the compressor and the detection circuit which greatly reduces the vibration induced phenomena.

Advantageously, the cooler still contains an exchanger 8 which thermally connects the circulating gas in the high-pressure part with the circulating gas in the low pressure part. The exchanger 8 is configured such that the gas present in the high-pressure part either pre-cooled by the relaxed and cooler gas found in the low pressure part. The exchanger 8 is advantageously a countercurrent exchanger which allows to increase the effectiveness of liquefaction of the mixture at the relief port. In a countercurrent exchanger, the flow of hot gas goes in the opposite direction of the flow of cold gas.

The countercurrent exchanger can be achieved in different ways, for example by means of concentric metal tubes or parallel plates increasing the surface area of exchange. The metal tubes can be smooth. In variant, the metal tubes are textured to increase the contact surface. For example, the metal tubes are covered with blades or they can be corrugated. What is done for the concentric tubes can also be applied to the parallel plates.

The exchanger 8 can be made in metal, but the exchanger can also be made in silicon or of glass which facilitates the realisation of a smaller dimension, because it is possible de fabricate the latter by means of micro-machining with technologies used classically in microelectronics or in nanotechnology.

In certain embodiments, several exchangers 8 can be mounted in parallel in the flow direction of the mixture.

It is also possible to mount several exchangers 8 in series. Advantageously in this configuration, of phase separators mounted to or between the exchangers. The phase separators are configured to separate gas and liquids so that liquids leave the high pressure circuit to integrate the low pressure circuit. This embodiment is particularly effective because it is mostly gas which is propelled and not a mixture gas/liquid.

In particular embodiment shown in FIG. 1, the Joule-Thomson cooler represented in FIG. 1 is combined with a Dewar 9 comprising an outer envelope. The detection circuit is advantageously placed under vacuum in the Dewar 9. It is also advantageous to place the internal cavity 7, the exchanger 8 and port 5 under vacuum.

In a particular embodiment not represented, the cold table 3 is carried out by the substrate of readout circuit 2 which allows to limit the overall mass of material at low temperature and thus reduce thermal inertia and mechanics inertia of the detection system.

In order to define an area of observation and to protect detection circuit 1 from external radiation interference outside this area of observation, the detection device preferentially includes a cold shield 10 and favourably a lens.

The cold shield 10 is realised in an opaque material to the radiation to be detected by the detection circuit. The cold shield 10 is preferentially covered at least on its internal face by a coating reducing the reflecting interference of the incident radiation.

The cold shield 10 presents an adequate form and it surrounds the detection circuit in order to limit as much as possible, the introduction of a radiation incident elsewhere by the area of observation.

The invention claimed is:

1. A device for detecting infrared radiation, the device comprising:
    a detection circuit configured to detect the infrared radiation, the detection circuit being provided with at least one photodetector;
    a readout circuit electrically connected to the detection circuit and being configured to process an electrical signal transmitted by the detection circuit; and
    a Joule-Thomson cooler including:
        a cold table thermally and mechanically connected to the detection circuit and the readout circuit, the cold table having an internal cavity;
        a relief port arranged at an input of the internal cavity, the relief port being configured to relax a gas and cool the cold table by a Joule-Thomson effect; and
        a compressor with an outlet supplying the relief port with gas and an input receiving the relaxed gas from an output of the internal cavity, wherein
    an inner wall of the internal cavity is textured in the vicinity of the device to form an evaporator, the evaporator being in thermal contact with the device.

2. The device according to claim 1, further comprising an exchanger configured to cool the gas at the outlet of the compressor by means of the relaxed gas at the output of the internal cavity.

3. The device according to claim 2, wherein the exchanger is a countercurrent exchanger.

4. The device according to claim 1, wherein the compressor is configured to generate a pressure gradient between 2 and 15 bar.

5. The device according to claim 1, wherein the detection device is devoid of a pre-cooling module of the gas.

6. The device according to claim 1, wherein the detection circuit and the readout circuit are fixed onto the cold table.

7. A cooling process for detecting infrared radiation, the cooling process comprising:
    providing a detection device configured to detect infrared radiation including:
        a detection circuit configured to detect the infrared radiation, the detection circuit being provided with at least one photodetector,
        a readout circuit electrically connected to the detection circuit and being configured to process an electrical signal transmitted by the detection circuit, and
        a Joule-Thomson cooler including:
            a cold table thermally and mechanically connected to the detection circuit and the readout circuit, the cold table having an internal cavity,
            a relief port arranged at an input of the internal cavity, the relief port being configured to relax a gas and cool the cold table by a Joule-Thomson effect, and
            a compressor with an outlet supplying the relief port with gas and an input receiving the relaxed gas from an output of the internal cavity, wherein
        the gas is a gaseous mixture containing at least one gas selected among ethane, isobutane, methane, krypton, propane, pentane, ethylene, butane, and
        an inner wall of the internal cavity is textured in the vicinity of the detection device to form an evaporator, the evaporator being in thermal contact with the detection device.

8. The cooling process according to claim 7, wherein the gaseous mixture contains at least one non liquefiable gas at the operating temperature of the cooler in order to have a gaseous phase upstream and downstream of the compressor.

9. The cooling process according to claim 7, wherein the gaseous mixture contains at least one additive of hydrofluoroether type.

10. The device according to claim 6, wherein the detection circuit is fixed to the readout circuit and the readout circuit separated the detection circuit from the cold table.

* * * * *